(12) United States Patent
Aguiar et al.

(10) Patent No.: US 11,477,996 B2
(45) Date of Patent: Oct. 25, 2022

(54) PRODUCTION PROCESS OF SOYBEAN MEAL WITH HIGH CONTENT OF SOLUBLE PROTEINS AND PRODUCT SO OBTAINED

(71) Applicant: Rio Pardo Bioenergia SA, Sidrolândia (BR)

(72) Inventors: Osvaldo Neves de Aguiar, Campinas (BR); Cesar Borges, São Paulo (BR); Luiz Antonio Gonçalves, Jacareí (BR)

(73) Assignee: RIO PARDO BIOENERGIA SA, Sidrolândia (BR)

( * ) Notice: Subject to any disclaimer, the term of this patent is extended or adjusted under 35 U.S.C. 154(b) by 271 days.

(21) Appl. No.: 16/156,580

(22) Filed: Oct. 10, 2018

(65) Prior Publication Data

US 2019/0104753 A1    Apr. 11, 2019

(30) Foreign Application Priority Data

Oct. 10, 2017    (BR) ............................ 2017 021876 7

(51) Int. Cl.

| | |
|---|---|
| *A23J 1/14* | (2006.01) |
| *B01D 3/10* | (2006.01) |
| *B01D 11/02* | (2006.01) |
| *A23L 11/00* | (2021.01) |
| *A23L 11/30* | (2016.01) |
| *A23K 10/30* | (2016.01) |
| *B01D 3/14* | (2006.01) |
| *A23J 3/32* | (2006.01) |
| *A23J 3/30* | (2006.01) |

(52) U.S. Cl.
CPC ................. *A23J 1/142* (2013.01); *A23J 1/14* (2013.01); *A23J 3/30* (2013.01); *A23J 3/32* (2013.01); *A23K 10/30* (2016.05); *A23L 11/07* (2016.08); *A23L 11/32* (2016.08); *B01D 3/10* (2013.01); *B01D 3/143* (2013.01); *B01D 11/0288* (2013.01); *B01D 11/0296* (2013.01); *A23V 2002/00* (2013.01)

(58) Field of Classification Search
CPC ... A23L 11/07; A23L 11/32; A23J 1/14; A23J 1/142; A23J 3/30; A23J 3/32; B01D 3/10; B01D 3/143; B01D 11/0288; B01D 11/0296
USPC .......................................................... 426/322
See application file for complete search history.

(56) References Cited

U.S. PATENT DOCUMENTS

| | | | | |
|---|---|---|---|---|
| 3,734,901 | A * | 5/1973 | Hayes et al. .............. | C11B 1/10 530/378 |
| 3,897,574 | A * | 7/1975 | Pass ........................ | A23J 1/142 426/430 |
| 4,219,470 | A * | 8/1980 | Karnofsky ............... | A23J 1/142 426/656 |
| 4,496,599 | A * | 1/1985 | Steinkraus ................ | A23J 1/14 426/430 |
| 4,859,371 | A * | 8/1989 | Diosady ............. | B01D 11/0246 554/14 |
| 5,620,728 | A * | 4/1997 | Langley ............... | B01D 11/023 426/312 |

OTHER PUBLICATIONS

NPL Carla et al. (Machine translation of WO 2014/115067A) (Year: 2014).*
NPL Cegla et al. (in J Food Sci. pp. 816-820, vol. 42(3), 1977). (Year: 1977).*
NPL Hull definition (Retrieved on Aug. 24, 2020). (Year: 2020).*

* cited by examiner

*Primary Examiner* — Donald R Spamer
*Assistant Examiner* — Bhaskar Mukhopadhyay
(74) *Attorney, Agent, or Firm* — B. Aaron Schulman, Esq.; Stites & Harbison, PLLC

(57) ABSTRACT

A process for the production of soybean meal with a high content of soluble proteins in which a soybean meal with a content of soluble proteins in KOH in the range of 60 to 75% is reached, in which the soluble sugars are first removed from the soybean meal for extraction with aqueous ethanol solution and then the oil by extraction with hexane, without intermediate desolventization and in a single integrated industrial unit; an SPC soybean meal having 58-62% of a crude protein content; and 60-70% of soluble proteins in KOH.

5 Claims, 4 Drawing Sheets

PRODUCTION PROCESS OF SOYBEAN MEAL WITH HIGH CONTENT OF SOLUBLE PROTEINS AND PRODUCT SO OBTAINED

FIELD OF APPLICATION

The present patent invention relates to a process for the production of soybean meal with a high content of soluble proteins belonging to the chemical area, particularly a process in which a soybean meal with a content of soluble proteins in KOH in the range of 60 to 75% is reached, in which the soluble sugars are first removed from the soybean meal for extraction with aqueous ethanol solution and then the oil by extraction with hexane, without intermediate desolventization and in a single integrated industrial unit.

BACKGROUND OF THE ART

Currently, two types of soybean meal are marketed. A soybean meal with a crude protein content of 44 to 48% used in animal food, and another called SPC (soybean protein concentrate), with a crude protein content of 58 to 62%, used in special animal food.

Production of Meal of 44 to 48% Proteins

In the current technology of soybean meal production with crude protein content of 44 to 48%, soybean goes through the following process steps:
1. Drying;
2. Storage;
3. Pre-cleaning for removal of impurities;
4. Breaking of soy beans in crushing mills;
5. Removal of husk in sieves;
6. Conditioning with indirect vapor to open the cells containing oil;
7. Lamination;
8. (Optional) Processing in the expander for formation of expanded mass;
9. Cooling of the tart;
10. Extraction of oil with hexane;
11. Desolventization/toasting;
12. Distillation for recovery of hexane;
13. Condensation and recycle of hexane; and
14. Degumming of oil.

In the extraction step, the laminated soybean or in the form of expanded mass is forwarded to the extractor for oil removal with hexane. The industrial process is continuous, and hexane is fed counter current. The extractors can be of longitudinal or circular belt (DeSmet, Crown or Rotocell). Hexane also removes the gums, peptides and lecithin contained in the soybean that must be removed from the crude oil later in the degumming.

Subsequently, the solvent and part of the moisture present in the bran are removed in the desolventizer/toaster (DT) where inactivation by heating of food-damaging enzymes is also performed. The bran is fed to the top of the device and is subjected to direct and indirect vapor heating. Next, the bran undergoes the drying and cooling processes. The hexane vapors generated in the DT and in the distillation are condensed, decanted and re-forwarded to the extractor.

At the end of the process, the crude oil is separated from the hexane by distillation, then degumming by centrifugation and subjected to drying.

Production of SPC (Soybean Protein Concentrate) Meal

To produce SPC meal, soybean meal already without oil, with a crude protein content of 48%, i.e. from the process described above, is used as raw material.

Thus, the bran is sieved and subjected to the extraction with ethanol aqueous solution to remove the soluble sugars present in the soybean. Next, the bran is subjected to a pressing process to remove part of the ethanoic solution. Subsequently the bran is desolventized in the DT and then the drying and cooling are performed.

Extraction equipment and DT are the same used in the process of producing bran 44 to 48%, only the change of solvent that becomes an ethanol aqueous solution is made.

Accordingly, the SPC meal in the processes currently in use is subjected to two heating in DT equipment and two heating in a dryer.

Meal Quality

The important parameter in the quality of soybean meal is the content of soluble proteins in KOH. The soluble protein is that available for absorption by the animal. Thus, greater the amount of soluble protein better the availability of the protein to the animal.

Soy bean may contain up to 100% of its protein soluble in KOH. However, we observe that the extent to which soybean grain is submitted to heat processing, with the objectives of: a) Destroying the anti-nutritional factors present, b) Removing the solvent and c) Drying it, there is then a decrease in the solubility of the proteins and consequently a decrease in the availability of the proteins to the animals.

Soybean meal of 44-48% protein with a minimum content of 80% of KOH soluble proteins is considered to be of good quality and has undergone adequate heat processing.

Now, high-protein content SPC meal presents higher soluble protein content in KOH in the 40-50% range due to the double heating to which they are submitted in the DT and in the dryer.

Prior Art

As part of the prior art, we highlight some documents which, although related to the subject matter, are processes distinct from that claimed in the present patent.

U.S. Pat. No. 5,097,017A—Process for making soy protein concentrate—mentions existing two industrial processes of SPC.

The two processes differ in the way they immobilize the proteins during the removal of the soluble substances from the meal.

One process involves the aqueous extraction of oil-free meal at a pH of 4 to 5, pH of which most of the proteins are soluble due to isoelectric association.

Another process uses aqueous solution of ethanol with a concentration of 60-70% by mass, which concentration insolubilizes most of the proteins at the same time as it solubilizes the constituents of lower molecular weight.

The two industrial processes mentioned have the following drawbacks:
1) Use as raw material the oil-free bran that has already undergone a desolventization and drying process degrading the soluble proteins; and
2) Remove together with the oil the soluble substances, being necessary the degumming stage of the oil.

U.S. Pat. No. 4,219,470A—Process for preparing a protein concentrate and the product obtained thereby—mentioned another process of sugar extraction with diluted ethanol, followed by oil extraction with anhydrous ethanol and mentions that this process did not have industrial success because it requires intermediate bran drying to 3% humidity to avoid the dilution of anhydrous ethanol. It is very difficult to reach this humidity level and there is a great deterioration of the soluble proteins in this attempt.

This patent proposes the removal of sugars and oil in 4 steps:

1) Extraction of sugars with ethanol aqueous solution with concentration of 50 to 70%; 2) Removal of part of the water by cold extraction with ethanol at a concentration of 90 to 92% by mass; 3) Two steps of oil removal with 90 to 92% concentrated ethanol with temperature near boiling to remove the oil.

Thus, this process presents as a drawback the fact that the process is not industrially applied, since the oil solubility in 90% ethanol solution is only 4%, which implies in recirculation of large volumes of ethanol, making the process economically unfeasible.

PI0704513-1, which relates to a solvent recovery system, confirms that in the current state of the art the SPC meal is produced from oil-free meal: "The process of obtaining enriched soybean meal as a whole is as follows. In a first step soybean meal with high protein contents between 46-48% is forwarded to an extractor, where the product is subject to washing in countercurrent with the hydroalcoholic solvent".

Thus, such document has the same drawbacks as previously indicated for U.S. Pat. No. 5,097,017A, since it uses the same productive sequence.

We also have PI0802961-0, which refers to pre-hydration before ethanol extraction, which also confirms the production of SPC meal from the oil-free meal: "Soy beans are processed on an industrial scale, obtaining as products resulting soybean oil and soybean meal, the latter usually being subjected to a process of protein concentration, obtaining the concentrated soybean meal, ideal for the protein enrichment of animal feed".

Likewise, such a process has the same drawbacks as previously indicated for U.S. Pat. No. 5,097,017A, since it uses the same production sequence. This patent explicitly mentions the meal quality in the current state of the art: " . . . , obtaining as a final product a concentrated soybean meal, with a high soluble protein content usually not exceeding 50%".

Finally, PI0704760-6 also mentions about SPC production process: "The process consists in the sugars extraction from the meal obtained after the soybean extraction by washing with water and ethyl alcohol".

Thus, it likewise exhibits the same drawbacks as previously indicated for the U.S. Pat. No. 5,097,017A, since it uses the same productive sequence.

Objectives of the Invention

Thus, the present invention patent aims to:

Propose a process of producing soybean meal with a high content of soluble proteins, in the range from 60 to 75%, in which the soluble sugars are first removed from the mass by extraction with aqueous ethanol solution and then the oil by extraction with hexane;

Propose a process of soybean meal production with high soluble protein content in a single integrated industrial unit;

Propose a process in which the two solvents (aqueous solution of ethanol and hexane) are mixed, which are later separated by decantation, separating a larger density aqueous fraction containing ethanol, water, sugars and other substances soluble in ethanol and water, and a lower density organic fraction containing hexane and oil.

Propose a process that eliminates two steps of heating existing in the current state of the art, which generates a meal with improved quality, with soluble protein content higher than the content of the currently produced SPC meal content.

Propose a process that removes in the initial step the extraction with ethanol, the phosphatides, lecithin and gums present in the soybean eliminated the degumming step of the oil existing in the units implanted in the current state of the art.

SUMMARY OF THE INVENTION

The present invention presents a process to produce SPC soybean meal with high soluble protein content, wherein:

The sugars extraction with countercurrent ethanol solution in extractor 1 is performed;

The sugars and other soluble compounds from the soybean and the excess water are separated by distillation producing an aqueous solution of ethanol that returns to the extractor 1;

Then the meal without soluble sugars still wet is subjected to extraction with hexane to remove the oil in extractor 2;

The mixture of water, sugars, ethanol, hexane and oil is separated by decantation, the aqueous fraction being sent for the distillation of ethanol and the organic fraction containing oil and hexane sent for the distillation of hexane;

The sugar-free and oil-free meal is subjected to a single heating in the DT to remove the solvents and a single heating for drying;

It is then cooled before being sent for storage;

The solvent vaporized in the DT (water, ethanol and hexane) is condensed and subsequently separated by decantation, with the aqueous fraction being sent to ethanol distillation and the hexane-containing organic fraction sent for hexane distillation.

DETAILED DESCRIPTION OF THE INVENTION

Figure 1:
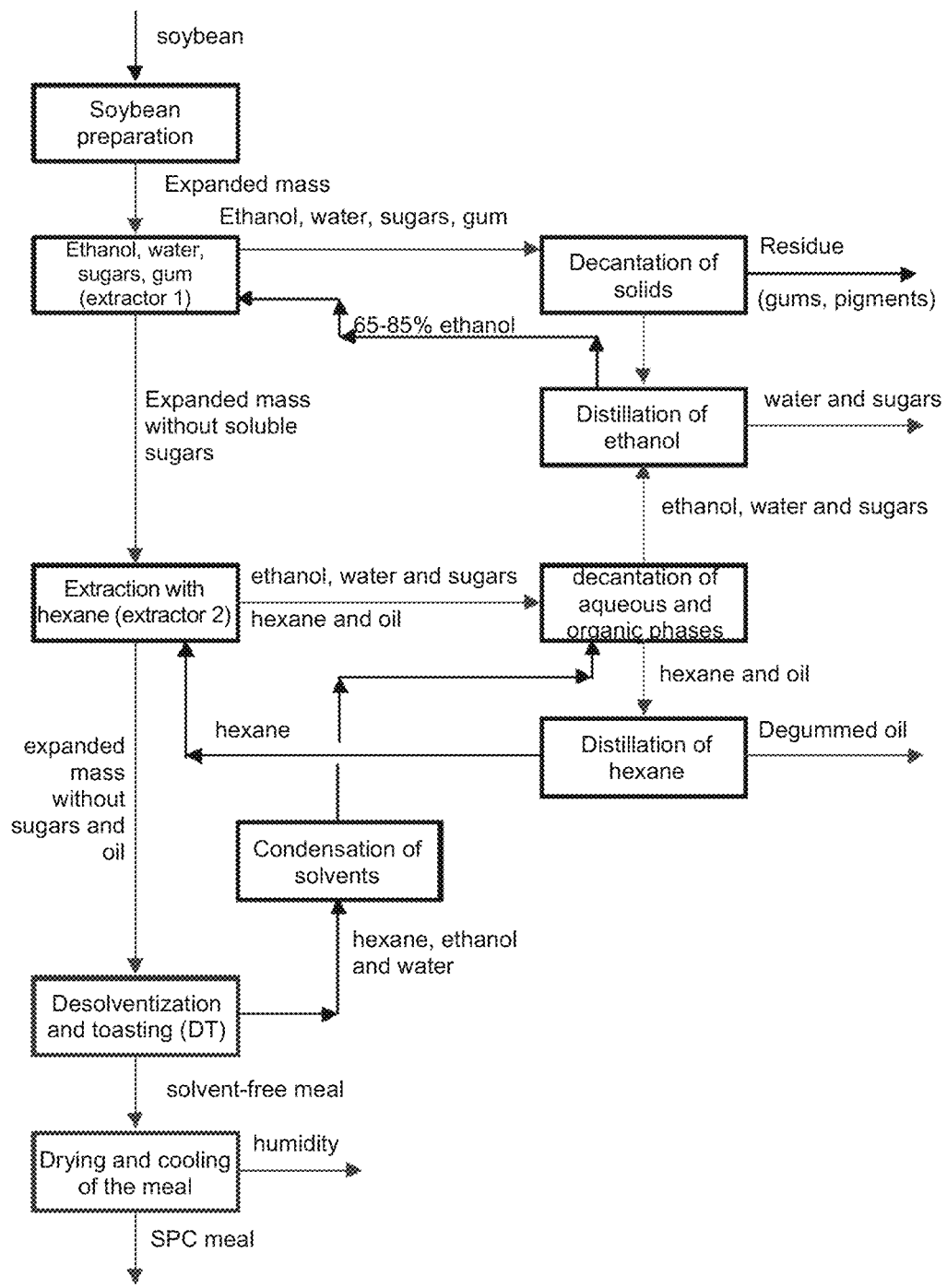
FIG. 1 is a block diagram of the SPC soybean meal production process, with high soluble protein content.
Figure 3:
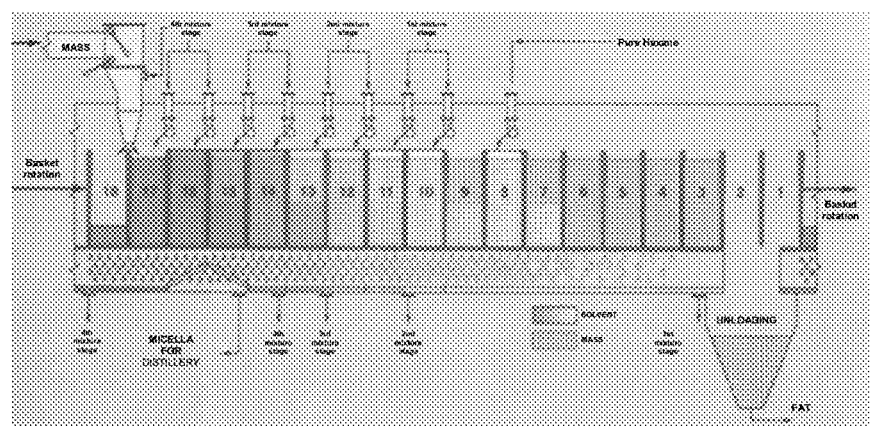
FIG. 3 is a schematic drawing of an extractor used in the process.

According to FIG. 1, the producing process of SPC soybean meal with high soluble protein content comprises the following steps:

1. Preparation of the soybean:

In this step the soybean is submitted to the conventional process of drying, storage, pre-cleaning, soybean breakage, bark removal, conditioning, lamination, processing in the expander (final mass expanded product) and cooling;

2. Extraction with ethanol:

The mass obtained in the previous step is conducted to a continuous extractor (see FIG. 3), called extractor 1, operating at atmospheric pressure and being subjected to the countercurrent extraction with aqueous ethanol solution from 65 to 85 weight %, previously preheated between 50 and 80° C.

The solution resulting from this extraction, containing from 15 to 25% water, 60 to 80% ethanol, 8 to 12% of sugars and other soluble substances is sent to the decantation of solids.

3. Decantation of solids:

In a conventional decanter used in the soybean processing industry a solid residue containing gums, pigments and fines from the expanded mass is separated.

Figure 4:
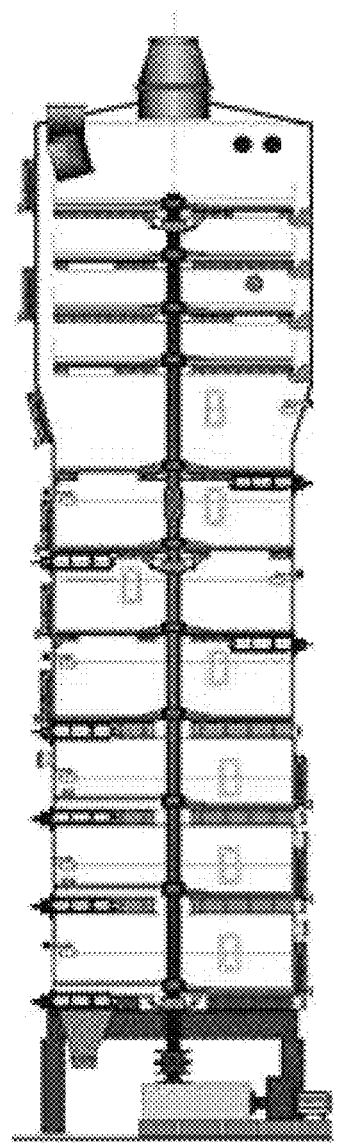
FIG. 4 is a schematic perspective view of a desolventizer/toaster (DT) used in the process.

The decanted liquid is sent to the distillation column to remove sugars and other soluble components;

4. Distillation of ethanol:

After decantation of the solids, the distillation is performed on a conventional "B" column, used in the sugar and alcohol industry, where an aqueous solution of ethanol having a concentration of 65 to 85 weight % is recovered on the top and as the bottom product, an aqueous fraction containing sugars and other soluble substances;

The distillate with an ethanol concentration between 65 and 85 weight % returns to the extractor 1 and its flow is adjusted by replacing the ethanol losses;

5. Extraction with hexane:

The expanded mass without soluble sugars is sent to a second continuous extractor, called extractor 2, where it is subjected to extraction with hexane;

The extractor 2 operates with a vacuum between −25 to 25 mm of water column and the hexane is preheated between 50 and 60° C. before being fed;

The solution containing hexane, oil, water, ethanol and sugars is collected and submitted to decantation for separation of the aqueous and organic phases;

6. Decantation of the aqueous and organic phases:

Decantation is performed in a conventional decanter usually used in the soybean processing industry, where by difference of densities a lighter organic fraction of a heavier aqueous fraction is separated as supernatant;

The organic phase with a content of 60 to 85% hexane and 15 to 40% oil is sent to the distillation to remove the oil from the hexane;

The aqueous phase containing ethanol, water and sugars dissolved is sent to the distillation of ethanol by recovering the aqueous solution which returns to the extractor 1;

7. Distillation of hexane:

The distillation is performed by vacuum in a conventional distillery of the soybean processing industry, separating as light fraction the hexane, which returns to the extractor 2 and as a heavy fraction the oil, which is sent to storage;

In distillation about 20% of the feed soybeans are separated as degummed oil;

The recovered hexane is adjusted to replace the losses;

8. Desolventization:

The expanded mass after extraction is subjected to desolventization in the DT (Desolventizer and Toaster) (see FIG. 4), where all the hexane and ethanol present in the mass are removed by indirect and direct heating with water vapor. After this operation, the mass is renamed SPC soybean meal, reaching a temperature between 85 and 100° C. at the device outlet;

9. Condensation of solvents:

The vapors from the DT are cooled with cooling water in a hull type condenser and tubes suffering from condensation. The condensate is also sent to the decantation of the aqueous and organic phases;

10. Drying and cooling:

SPC soybean meal is subjected to drying and subsequent cooling in a dryer/cooler;

Drying is performed with hot air at a temperature between 120 and 180° C.;

Cooling is performed with the passage of air at room temperature obtaining the SPC soybean meal at a temperature between 30 and 45° C. at outlet.

Figure 2:
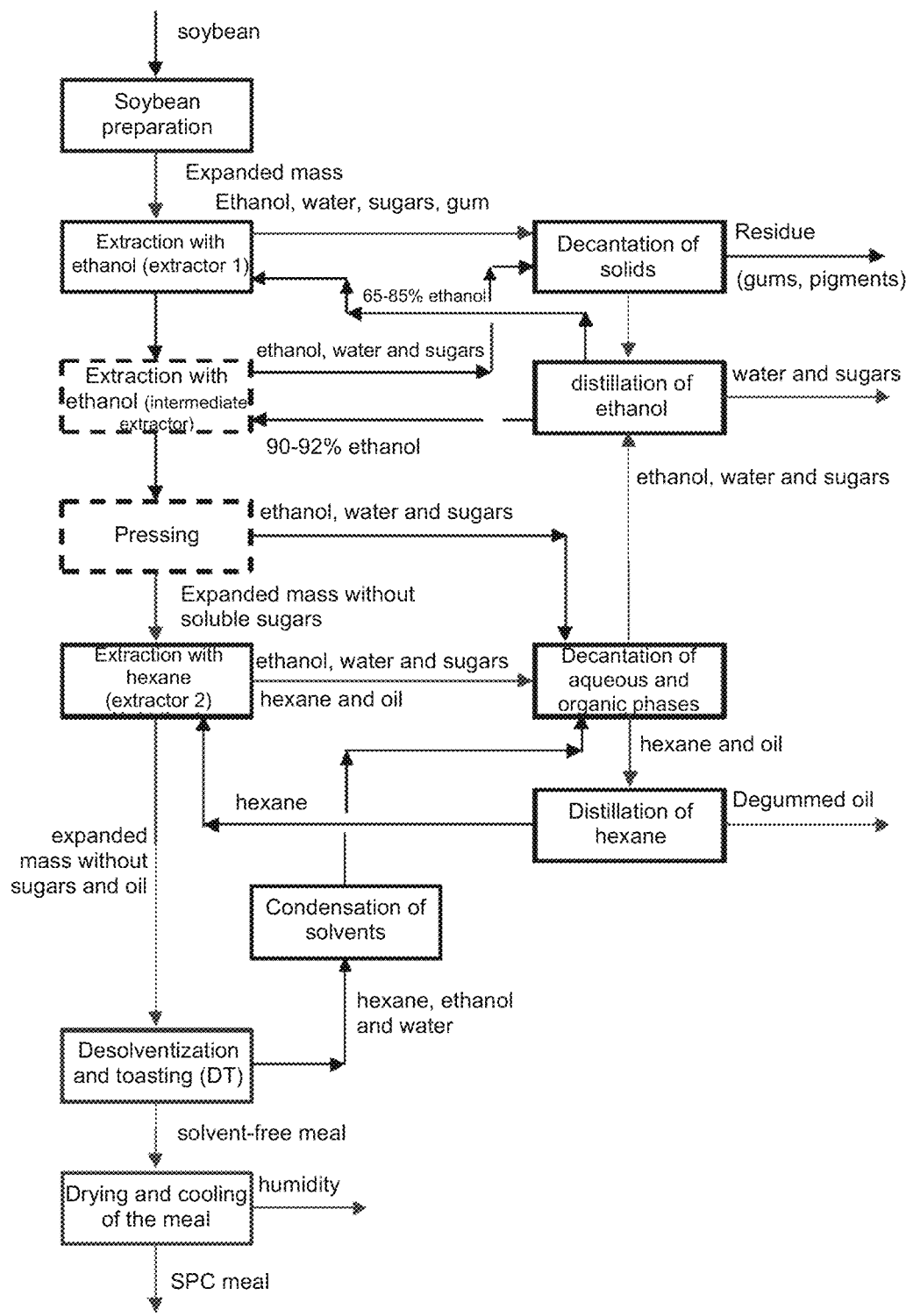
FIG. 2 is a block diagram of an option of SPC soybean meal SPC production process, with high soluble protein content.

According to FIG. 2, optionally after passing through the extractor 1, the mass may suffer extraction with aqueous solution of ethanol with a concentration of 90-92 weight % in an intermediate extractor for the reduction of the water content present in the mass;

The resulting ethanol solution is sent to another distillation column to remove water and sugars, adjusting its concentration for the return to the intermediate extractor;

Alternatively, a single distillation column with lateral withdrawal may be used to carry out the two separations; and This intermediate extractor may be constructed using part of extractor 1 or be an independent equipment.

Still according to FIG. 2, the mass may also optionally be passed through a continuous press to reduce the amount of aqueous ethanol solution. The separated solution, after decantation, is sent to the distillation of the ethanol.

Product Obtained with the Process

Through the process described above, a SPC meal is obtained with the following characteristics:

58-62% crude protein content; and
60-75% soluble proteins content in KOH.

Example of Obtention

An example of obtaining the invention will now be presented, in order to illustrate practical feasibility, without limiting the scope of the invention.

Example of the Invention

The production process of SPC soybean meal with high soluble protein content comprised the following steps:

1. Preparation of the soybean:

In this step soybean was subjected to the conventional process of drying, storage, pre-cleaning, grain breaking, bark removal, conditioning, lamination, processing in the expander (final expanded mass product) and cooling;

2. Extraction with ethanol:

2024 kg/h of mass obtained in the previous step is sent to a continuous belt extractor brand De Smet, called extractor 1, operating at atmospheric pressure and subjected to countercurrent extraction with 73 weight % aqueous ethanol solution preheated at 60° C.

The resulting solution containing 18% water, 72% ethanol, 10% sugars and other soluble substances was sent to the decantation of solids;

3. Decantation of solids:

In a conventional decanter used in the soybean processing industry a small amount of solid residue containing gums, pigments and fines from the expanded mass was separated.

The decanted liquid was continuously sent to the distillation column to remove sugars and other soluble components;

4. Distillation with ethanol:

After decantation of the solids, the aqueous solution of ethanol containing sugars was distilled in a conventional "B" column, where an aqueous solution of ethanol at 73 weight % was recovered at the top, and as the bottom product an aqueous fraction containing the sugars and other soluble substances;

The distillate with a concentration of ethanol at weight % returned to the extractor 1 and the flow was adjusted by replacing the ethanol losses;

5. Extraction with hexane:

The expanded mass without soluble sugars was sent to a second circular continuous extractor type Rotocell, called extractor 2, where it was subjected to extraction of the oil with hexane;

The extractor 2 operated with a 4 mm water column vacuum and the hexane was preheated to 55° C. before being sent to the extractor 2;

The solution containing hexane, ethanol, water, oil and sugars was collected and submitted to decantation for separation of the aqueous and organic phases;

6. Decantation of the aqueous and organic phases:

Decantation was performed by a conventional horizontal decanter of the soybean processing industry where by density difference a lighter organic fraction from a heavier aqueous fraction was separated as supernatant;

The organic phase with a content of 80% hexane and 20% oil, in a total of 1976 kg/hr was sent to the distillation section for separation of the oil from hexane;

The aqueous phase containing ethanol, water and dissolved sugars was followed for the distillation of ethanol by recovering the ethanol solution which returned to the extractor 1;

7. Distillation of hexane:

Distillation was performed under vacuum in the conventional distillery of the soybean processing industry, separating the hexane as light fraction, which returned to the extractor 2 and as a heavy fraction the oil, which was sent to storage;

In the distillation, 414 kg/hr of degummed oil was produced, without the use of the traditional degumming process (hydration, centrifugation and drying);

The hexane recovered was adjusted by replacing the losses;

8. Desolventization:

The expanded mass after extraction was subjected to desolventization in the DT (Desolventizer and Toaster), where all the hexane and ethanol present in the mass were removed by indirect and direct heating with water vapor, in a total of 1000 kg/hr, where the meal reached a temperature of 95° C. at the device outlet;

9. Condensation:

The DT vapors were condensed in a hull condenser and horizontal tubes and sent to the decantation of the aqueous and organic phases;

10. Drying and cooling:

The meal was subject to drying and then cooling in a conventional dryer/cooler;

The drying was performed with hot air at a temperature of 150° C.;

The cooling was performed with the passage of air at room temperature, obtaining in the meal outlet at a temperature of 45° C.

Results Obtained

By the example described above, SPC soybean meal was obtained with the following characteristics:

58.3% crude protein contents; and 60.9% soluble proteins contents in KOH.

Comparative Analysis

Below is a comparative analysis between the results obtained in the above example and the values of two commercial meals available in the Brazilian market, analyzed in a specialized external laboratory:

|  | Example of invention | Commercial 1 | Commercial 2 |
|---|---|---|---|
| Crude proteins (%) | 58.3% | 59.4 | 60.1 |
| Soluble proteins (%) | 60.9 | 44.5 | 46.3 |

Advantages Obtained with the Invention

With the process of this invention, the following extraordinary advantages were obtained:

Production of SPC soybean meal SPC with 60-75% soluble protein content, much higher than commercial products currently available in the national and international markets;

Integration of the two units into a single plant, rationalizing the SPC soybean meal production process SPC and reducing investment (CAPEX);

Elimination of duplicity of productive processes that heat the meal, and which significantly degrade the proteins, thus obtaining a better quality SPC soybean meal;

Obtaining degummed soybean oil due to the removal of lecithin, peptides and gums in the initial extraction with ethanol solution, thus dispensing with the degumming sector;

Lower cost of production due to the following factors:

lower consumption of electric power;

lower consumption of thermal energy;

less use of direct labor (only one unit);

a significant reduction in investment in CAPEX.

The scope of the present invention should not be limited to the example, but rather to the terms defined in the claims and their equivalents.

The invention claimed is:

1. A process for producing soybean meal with a high soluble protein content, comprising:
   (a) preparing a soybean by submitting the soybean to drying, storage, pre-cleaning, breakage, husk removal, conditioning, lamination and processing in an expander in order to obtain an expanded mass, and cooling;
   (b) extracting with ethanol, by submitting the expanded mass obtained in (a) to a first continuous extractor, operating at atmospheric pressure and subjected to a counter-current extraction with aqueous solution of ethanol of 65-85 weight %, preheated between 50° C. and 80° C.; obtaining a solution containing 15-25% water, 60-80% ethanol, 8-12% of sugars and other soluble substances;
   (c) decanting solids in a decanter, separating a solid residue containing gums, pigments and fines from the expanded mass, obtaining a decanted liquid;
   (d) distilling the ethanol on a distillation column, recovering an aqueous solution of ethanol having a concentration of 65-85 weight % at a top section of the distillation column and recovering an aqueous fraction containing the sugars and the other soluble substances a bottom section of the distillation column;

(e) returning the ethanol distillate to the first continuous extractor in (b) and adjusting the flow by replacing the ethanol losses;

(f) feeding the expanded mass treated in the first continuous extractor in (b) to a second continuous extractor, subjecting the expanded mass to an extraction with hexane; the second continuous extractor operating with a vacuum between −25 and 25 mm of water column and with hexane preheated between 50 and 60° C. before being fed to the second continuous extractor;

(g) collecting the solution containing hexane, oil, water, ethanol and sugars and submitting said solution to decantation, and obtaining a separated aqueous phase containing ethanol, water and dissolved sugars and a separated organic phase having 60-85% hexane and 15-40% oil;

(h) decanting the separated aqueous phase and the separated organic phase in a decanter wherein, by difference in densities, a lighter organic fraction is separated from a heavier aqueous fraction, as supernatant; separating the hexane and oil from the organic phase and returning the aqueous phase to the distilling the ethanol by recovering the aqueous solution which returns to the first continuous extractor in (b);

(i) distilling the hexane in vacuum conditions, separating the hexane as a light fraction and returning to the second continuous extractor; and separating the oil as a heavy fraction and sending to storage; and separating about 20% of the soybean as degummed oil and adjusting the recovered hexane to replace the losses;

(j) subjecting the expanded mass to desolventizing in a desolventizer and toaster, removing all of the hexane and ethanol present in the mass by indirect and direct heating with water steam; collecting the expanded mass as SPC soybean meal, reaching a temperature between 85 and 100° C. at an outlet of the desolventizer and toaster;

(k) cooling the vapors from the desolventizer and toaster with cooling water in a shell and tubes condenser suffering from condensation; the condensate returned to decanting the separated aqueous phase and the separated organic phase; and (l) drying and cooling the SPC soybean meal in a dryer/cooler, with hot air at a temperature between 120 and 180° C.; and cooling by passing the air to room temperature so that the SPC soybean meal is obtained at a temperature between 30 and 45° C. at an outlet of the dryer/cooler.

2. The production process according to claim 1, wherein optionally after passage through the first continuous extractor, the expanded mass is subjected to extraction with an aqueous solution of ethanol with a concentration of 90-92 weight % in an intermediate extractor for the reduction of the water content present in the expanded mass and the resulting ethanol solution is sent to a second distillation column to remove water and sugars, adjusting the concentration of the expanded mass and returning to the intermediate extractor.

3. The production process according to claim 1, wherein after passage through the first continuous extractor, the expanded mass is subjected to extraction with an aqueous solution of ethanol with a concentration of 90-92 weight % in an intermediate extractor for reduction in water content present in the expanded mass and the resulting ethanol solution is sent, together with the ethanol used in the first extractor, to a single distillation column, wherein ethanol 90-92% is removed at a top section and ethanol 65-85% is removed at a lateral section.

4. The production process according to claim 2, wherein the intermediate extractor is constructed using sections of first continuous extractor or as an independent extractor.

5. The production process according to claim 1, wherein the expanded mass optionally passes through a continuous press to reduce the amount of ethanol solution, where the separated solution, after decantation, is returned to distilling the ethanol in the distillation column.

* * * * *

UNITED STATES PATENT AND TRADEMARK OFFICE
CERTIFICATE OF CORRECTION

| | |
|---|---|
| PATENT NO. | : 11,477,996 B2 |
| APPLICATION NO. | : 16/156580 |
| DATED | : October 25, 2022 |
| INVENTOR(S) | : Aguiar et al. |

It is certified that error appears in the above-identified patent and that said Letters Patent is hereby corrected as shown below:

On the Title Page

Item (30):
Please change:
"Foreign Application Priority Data
Oct. 10, 2017 (BR) .......................... 2017 021876 7"
To:
- Foreign Application Priority Data
Oct. 10, 2017 (BR) .......................... 10 2017 021876 7 -

Signed and Sealed this
Eleventh Day of June, 2024

Katherine Kelly Vidal
*Director of the United States Patent and Trademark Office*